United States Patent [19]
Blackwell et al.

[11] 3,904,596
[45] Sept. 9, 1975

[54] BROWN DISPERSE 4-CARBOXAMIDO-4'-PHENYLAZOAZOBENZENE DYES

[75] Inventors: John Blackwell, Kennett Square, Pa.; Richard Edwin Peavy, Wilmington, Del.

[73] Assignee: E. I. Du Pont de Nemours and Company, Wilmington, Del.

[22] Filed: July 25, 1972

[21] Appl. No.: 275,038

[52] U.S. Cl. ............... 260/187; 8/21 C; 8/41 C; 260/174; 260/178; 260/184; 260/185
[51] Int. Cl.$^2$ .......................................... C09B 31/04
[58] Field of Search ............. 260/187, 177, 185, 184

[56] References Cited
UNITED STATES PATENTS

| | | | |
|---|---|---|---|
| 2,127,986 | 8/1938 | Roos | 260/187 |
| 2,135,964 | 11/1938 | Dahlen et al. | 260/185 |
| 2,563,091 | 8/1951 | Wright | 260/187 |
| 3,359,255 | 12/1967 | Liechti | 260/187 |
| 3,451,991 | 6/1969 | Kleiner | 260/187 |

FOREIGN PATENTS OR APPLICATIONS

| | | | |
|---|---|---|---|
| 378,440 | 7/1964 | Switzerland | 260/187 |
| 4,110,342 | 6/1966 | Japan | 260/187 |

*Primary Examiner*—Henry R. Jiles
*Assistant Examiner*—Robert W. Ramsuer

[57] ABSTRACT

Yellow-brown to red-brown disperse disazo dyes, useful for dyeing water swellable cellulosic or synthetic fibers or blends or mixtures thereof to light-, sublimation-, crocking-, wash- and drycleaning fast shades, which dyes have the formula X—N=N—Y—N=N—Z—NHCOR wherein X is phenyl, optionally containing 1–3 substituents, Y and Z each is 1,4-phenylene, optionally containing 1–2 substituents, or 1,4-naphthylene, and R is alkyl, alkoxyalkyl, cyclohexyl, benzyl, phenyl or phenyl monosubstituted with methyl, methoxy, Cl, Br or $NO_2$.

2 Claims, No Drawings

BROWN DISPERSE 4-CARBOXAMIDO-4'-PHENYLAZOAZOBENZENE DYES

BACKGROUND OF THE INVENTION

1. Field of the Invention

This invention relates to water insoluble brown disazo dyes which have utility in the dyeing of a broad spectrum of synthetic and natural materials, especially water swellable cellulosic materials, or mixtures or blends of such synthetic and natural materials.

2. Description of the Prior Art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

1. A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.
2. A water soluble preformed dye having an affinity for the cellulosic material is exhausted onto the material from an aqueous solution by a procedure which involves reducing the solubility of the dye in the aqueous solution, as with direct dyes.
3. A dye containing a substituent which reacts with the cellulose or a modified cellulose is exhausted onto the material from either an aqueous or non-aqueous solution under conditions such that the dye is chemically bonded to the substrate, as with fiber reactive dyes.
4. Water insoluble pigments are bonded to the cellulose with polymeric materials, as in pigment printing.
5. A finely divided form of a water insoluble dye is incorporated into the cellulose during a manufacturing step, as is sometimes done during spinning of viscose rayon.

None of these conventional procedures can be used to dye water swellable cellulose by directly introducing into the material a preformed, nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pat. Nos. 396,692 and 2,069,215 and British Pat. No. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of low water solubility for dyeing cotton is disclosed in British Pat. No. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Because of basic differences in the chemical and physical properties of the two types of materials, the components of the blend or mixture usually are dyed in complex two-stage processes employing two different types of dyes, each component being dyed independently of the other in a separate step. Cross-staining may result and the amounts of dyes required usually are high, with each component undesirably interfering with the dyeing of the other. When cross-staining occurs, the dye must be capable of being scoured off the stained component. Even under optimum conditions, balance, that is, equal shade and shade strength, between the components of the blend is difficult to achieve. If the dyed fabric lacks balance, under use conditions frosting (discolored areas) will occur in the regions of maximum wear. The complexities of the aforesaid two-stage process for dyeing blends also can be appreciated from a consideration of the divergency of operating conditions between conventional dyeing processes for cellulosic and for synthetic materials. In contrast to the prior art procedures for dyeing water swellable cellulose, the usual procedures for dyeing synthetic materials are based on dissolution of water insoluble dyes in the synthetic material.

Representative of prior art on the dyeing of blends of cellulosic and synthetic materials employing a two-stage process is U.S. Pat. No. 3,313,590. Analogous to the dyeing of such blends and confirming the aforesaid distinction between water swellable cellulosic materials and nonswellable cellulose acetate, U.S. Pat. No. 3,153,563 discloses a two-stage process wherein the cellulose acetate is dyed with a water insoluble dye without coloring the cellulose which then is dyed in an independent step.

In order to avoid the aforesaid problems relative to the dyeing of blends or mixtures of water swellable cellulosic and synthetic materials, prior art printing operations frequently are carried out using resin bonded pigments. Since such processes provide only surface coloration, the prints obtained often exhibit crocking, poor "hand" and low fastness to washing and drycleaning.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal, 32, 331-337 (1962) report that cotton can be swollen with water containing both high boiling, water soluble, non-reactive compounds of limited molecular weight and a cross-linking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. No. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in Canadian Pat. No. 832,343 disclose a process for dyeing water swellable cellulosic materials with disperse dyes, which process comprises contacting a water swellable cellulosic material in any sequence with the following:

1. water in an amount sufficient to swell the cellulose;
2. a dye in an amount sufficient to color the cellulose, a boiling saturated solution of which dye in 0.1 Molar aqueous sodium carbonate exhibits an optical absorbance not in excess of about 30; and
3. a solvent in an amount sufficient to maintain swelling of the cellulose if water is removed, and which
   a. is at least 2.5 weight % soluble in water at 25°C.,
   b. boils above about 150°C. at atmospheric pressure,
   c. is a solvent for the dye at some temperature in the range of about 0° to 225°C., and
   d. has the formula

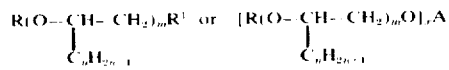

wherein
$n$ is 0 or 1;
$m$ is a positive whole number;
R is H, $C_{1-8}$ alkyl, $C_{7-15}$ aralkyl or alkaryl, $$R^2C(=O)-,$$

$$R^2SO_2-,$$

or $R^2OC(=O)-;$ $R^1$ is $-OH$, $-OR^2$, $-SR^2$, $-NHR^2$, $-NR^2(C_{1-8}$ alkyl), $-NR^2(C_{7-15}$ aralkyl or alkaryl), $$-OCR^2,$$
$$\parallel$$
$$O$$

$-OSO_2R^2$, $-OCOR^2$,
$-NH(phenyl)$, or $-NH(naphthyl)$;
$R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;
$x$ is the number of unsatisfied valencies in A; and
A is $ROCH_2CHORCH_2-$, $-CH_2CHORCH_2-$,

$-CH_2C(CH_2OR)_3$, $(-CH_2)_2C(CH_2OR)_2$, $(-CH_2)_3CCH_2OR$, $(-CH_2)_4C$, $-CH_2(CHOR)_nCH_2OR$, $-CH_2(CHOR)_nCH_2-$, or $-CH_2(CHOR)_{y-z}(-CH)_zCH_2-$ in which $y$ is 2, 3, or 4,
$z$ is 0, 1, 2, 3 or 4 but no greater then $y$, and R is as above-defined;
provided that at some stage during the process the interior of the swollen cellulose is contacted with a solution of the dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

OBJECTS AND SUMMARY OF THE INVENTION

It is an object of this invention to provide yellow-brown to red-brown disperse disazo dyes which are useful in the above-described process of Blackwell et al. for dyeing water swellable cellulosic materials and blends or mixtures thereof with synthetic materials. It is a further object to provide dyes which give a good balance of shade when used to dye the aforesaid blends or mixtures. Another object is to provide disperse dyes which inhibit good to excellent fastness to light, washing, crocking, sublimation and drycleaning when applied to water swellable cellulosic materials, synthetic materials or blends or mixtures of such cellulosic and synthetic materials.

In summary, the present invention resides in dyes of the formula

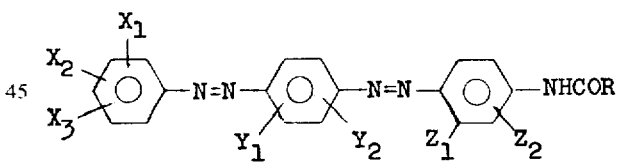

wherein
$X_1$ is H, alkyl, Cl, Br, CN, $CF_3$, COalkyl, COphenyl, $SO_2$alkyl, $SO_2$phenyl, CONHalkyl, CON(alkyl)$_2$, CONHphenyl, CON(alkyl)phenyl, $SO_2N$(alkyl)$_2$, $SO_2N$(alkyl)phenyl, NHCOalkyl, NHCOphenyl, $CO_2$alkyl or $CO_2$phenyl,
$X_2$ is H, alkyl, alkoxy, Cl, Br or CN,
$X_3$ is H, alkyl, alkoxy, Cl, Br or $NO_2$,
$Y_1$ is H, methyl, ethyl, methoxy, ethoxy or Cl and $Y_2$ is H, methyl, ethyl, methoxy or ethoxy, or $Y_1$ and $Y_2$ together with the benzene ring complete a 1,4-naphthylene radical,
$Z_1$ is H, methyl, Cl or NHCOR and $Z_2$ is H, methyl or methoxy in the para position to $Z_1$, or $Z_1$ and $Z_2$ together with the benzene ring all 1,4-naphthylene, and
R is alkyl, alkoxyalkyl, cyclohexyl, benzyl, phenyl or phenyl substituted once with methyl, methoxy, Cl, Br or $NO_2$.

each of said alkyl, alkoxy and alkoxyalkyl in $X_1$, $X_2$, $X_3$ and R containing 1–8 carbon atoms.

DETAILED DESCRIPTION OF THE INVENTION

The brown disperse disazo dyes of the formula set forth above are prepared by a series of reactions which involve diazotizing a primary aromatic amine of the formula

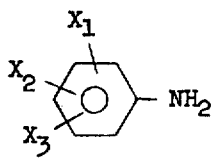

wherein $X_1$, $X_2$ and $X_3$ are as defined above, coupling the resulting diazo compound to a second primary aromatic amine of the formula

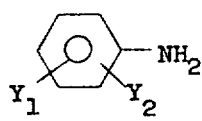

wherein $Y_1$ and $Y_2$ are as defined above and coupling the resulting monoazo compound to a third primary aromatic amine of the formula

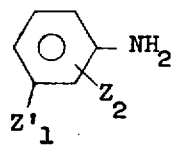

wherein $Z'_1$ is $Z_1$ or $NH_2$ and $Z_1$ and $Z_2$ are as defined above. All diazotization and coupling reactions are carried out by conventional prior art procedures. Examples of the first, second and third aromatic amines are provided in Tables 1, 2 and 3, respectively. The resultant disazo compounds containing one or two primary amino groups from the third aromatic amine are acylated by conventional techniques with an aliphatic or aromatic carboxylic acid chloride or bromide to yield the desired dye. Examples of suitable acid halides are provided in Table 4.

TABLE 1

| | |
|---|---|
| aniline | N-octylanthranilamide |
| o-,m- or P-toluidine | 3-caprylamidoaniline |
| p-butylaniline | 2-ethylsulfonylaniline |
| o-,m- or P-chloroaniline | p-butoxyaniline |
| o-,m- or p-bromoaniline | o-phenetidine |
| 2-chloro-4-toluidine | 2,5-dichloroaniline |
| 3-chloro-2-toluidine | 2,5-dibromoaniline |
| 3-chloro-4-cyanoaniline | 5-chloro-2-cyanoaniline |
| o-,m- or p-anisidine | 2-chloro-5-dibutylsulfamyl-aniline |
| o- or p-cyanoaniline | xylidines |
| 2,4-dicyanoaniline | 2-chloro-5-nitroaniline |
| 2,5-dicyanoaniline | 5-nitro-2-toluidine |
| 2-chloro-4-cyanoaniline | o-,m- or p-nitroaniline |
| 2,4-dichloroaniline | 2-chloro-4-nitroaniline |
| 2,4-dibromoaniline | 2-bromo-4-nitroaniline |
| o-aminobenzotrifluoride | 2-cyano-4-nitroaniline |
| 2-amino-5-chlorobenzotri-fluoride | 2,4-dinitroaniline |
| 4-amino-2-chloropropion-anilide | 2-nitro-4-anisidine |
| 5-chloro-2-dimethylsulfamyl-aniline | 4-nitro-2-anisidine |
| 4-chloro-2-anisidine | 2-nitro-4-octyloxyaniline |

Table 1—Continued

| | |
|---|---|
| 5-bromo-2-anisidine | 2,6-dichloro-4-nitroaniline |
| 2-methoxy-5-toluidine | 2-chloro-6-cyano-4-nitro-aniline |
| 4-amino-3-chlorobenzotri-fluoride | 2,6-dibromo-4-nitroaniline |
| 5-amino-2-bromobenzotri-fluoride | 2-bromo-4,6-dinitroaniline |
| butyl anthranilate | 2-chloro-4,6-dinitroaniline |
| methyl 4-chloroanthranilate | 2-cyano-4,6-dinitroaniline |
| p-aminobenzoic acid, octyl ester | 2-bromo-6-cyano-4-dinitro-aniline |
| p-aminoacetophenone | 2-amino-3,5-dinitrobenzo-trifluoride |
| p-octylsulfonylaniline | 2,5-dichloro-4-nitroaniline |
| p-aminobenzoic acid, butyl-amide | 2,4-dinitro-6-amylsulfonyl-aniline |
| 2-amino-3,5-dinitrobenzoic acid, butyl ester | p-aminobenzophenone |
| 2,6-dicyano-4-nitroaniline | p-aminobenzanilide |
| 2-amino-5-nitrobenzoic acid, propyl ester | 4-amino-3-bromobenzophenone |
| 4-amino-3-nitrobenzoic acid, diethylamine | metanilic acid, N-ethyl-anilide |
| 5-nitro-2-anisidine | 4'-amino-2'-chlorobenz-anilide |
| 2-amino-4-nitrobenzoic acid, dimethylamide | p-aminobenzoic acid, N-methylanilide |
| 2-nitro-4-toluidine | p-phenoxyaniline |
| 4-nitro-2-toluidine | 2,3-diethyl-4-phenylsulfonyl-aniline |
| 3-chloro-4-cyanoaniline | 2,5-dimethoxy-4-phenylsulfonyl-aniline |
| 4-bromo-2,6-dinitroaniline | 2-amino-4,5-dichlorobenzo-phenone |
| 4-chloro-2,6-dinitroaniline | 2-chloro-6-phenylsulfonyl-aniline |
| 5-chloro-2-cyano-4-nitro-aniline | 2-amino-3,5-dinitrobenzoic acid, phenyl ester |
| phenyl anthranilate | 2,4-dinitro-6-phenylsulfonyl-aniline |
| p-phenylsulfonylaniline | 2-amino-3,5-dinitrobenzo-phenone |

TABLE 2

| | |
|---|---|
| aniline | cresidine |
| o- or m-toluidine | 2,5-dimethoxyaniline |
| | 2,5-diethoxyaniline |
| o- or m-ethylaniline | o- or m-chloroaniline |
| o- or m-anisidine | 5-chloro-2-anisidine |
| o-phenetidine | 5-chloro-2-toluidine |
| 2,5-xylidine | α-naphthylamine |
| 2,5-diethylaniline | |

TABLE 3

| | |
|---|---|
| aniline | 2,5-xylidine |
| m-toluidine | cresidine |
| m-chloroaniline | 5-chloro-2-toluidine |
| m-phenylenediamine | 5-chloro-2-anisidine |
| 3-aminoacetanilide | 5-acetamido-2-toluidine |
| 3-amino-valeranilide | 5-benzoamido-2-anisidine |
| 3'-aminocyclohexanecarbox-anilide | α-naphthylamine |
| 3'-aminobenzoanilide | 2,4-diaminotoluene |

TABLE 4

| | |
|---|---|
| acetyl chloride | benzoyl chloride |
| methoxyacetyl chloride | o-, m- or p-toluoyl chloride |
| propionyl chloride | anisoyl chloride |
| butyryl chloride | o-, m- or p-chlorobenzoyl chloride |
| valeryl chloride | o-, m- or p-bromobenzoyl chloride |
| pelargonyl chloride | m- or p-nitrobenzoyl chloride |
| hexahydrobenzoyl chloride | phenylacetyl chloride |

The following description is representative of the aforementioned prior art procedures.

The first amine can be diazotized by adding sodium nitrite to a solution or suspension of the amine in aqueous hydrochloric or sulfuric acid at a suitable temperature, generally 0°–25°C. It is sometimes advantageous, for example, in the case of amines having limited solubility in aqueous mineral acid, to replace some or all of the water with an organic solvent, such as acetic acid or a mixture of acetic and propionic acids. Other amines, for example, those containing two or more strongly electron-withdrawing substituents, can be diazotized in nitrosylsulfuric acid. In coupling the diazotized amine to the second aromatic amine, the latter can be dissolved or suspended in dilute aqueous mineral acid, optionally containing an organic solvent such as acetic acid or methanol, and admixed with, by adding thereto or by adding to it, the diazotized amine. The coupling reaction may be accelerated by raising the pH to about 2–3 with a suitable salt, such as sodium formate or acetate. When the reaction is complete, the pH is raised with a salt or base, such as sodium acetate or sodium hydroxide, to precipitate the monoazo amine in the free base form. The product is isolated by filtration. The monoazo amine can be diazotized in aqueous mineral acid, preferably containing an organic solvent such as acetic acid, with sodium nitrite at 10°–30°C. Coupling of the diazonium salt to the third aromatic amine in a suitable solvent such as aqueous mineral acid or an aqueous organic medium, optionally containing mineral acid, produced a disazo amine which is isolated by filtration. As an alternative procedure, the monoazo amine can be diazotized and coupled in situ without a prior isolation step if the reaction medium is chosen with care. Usually, this requires the use of a suitable quantity of an organic solvent, such as acetic acid. The disazo amine is acylated with an acid chloride in the presence of an organic or inorganic acid acceptor, such as pyridine or potassium carbonate, in a suitable organic solvent to yield the desired disazo dye.

The dyes of this invention can be applied to water-swellable cellulosic materials or to mixtures or blends thereof with synthetic materials, such as polyesters, by the above-described Blackwell et al. process. The cellulosic materials which can be dyed include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable with the dyes of this invention. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. Dyeing of viscose rayon fabric is promoted by pretreatment with 10% aqueous caustic, or by the presence of wetting agents, preferably of the nonionic type, which assist penetration of the fibers by the dye solvent. Mixtures of cotton and rayon fibers acan be dyed, and the present dyes also can be used to dye purified wood pulp and paper. Excluded herein as the water swellable cellulosic material is cellulose acetate which does not exhibit the requisite swellability in the presence of water.

The dyes of this invention are particularly useful for dyeing blends of cotton and polyester, such as those containing 50–80% polyethylene terephthalate and 20–50% cotton. Since the dyes of this invention can be used to dye both components in a blend, scourability as a factor in dye selection is avoided because of minimization of the problem of cross-staining that is generally encountered when polyester/cellulosic blend fabrics are dyed conventionally with two classes of dyes, such as disperse/vat or disperse/direct dye combinations.

The dyes of this invention dye the substrate directly, that is, they do not require oxidation, reduction, hydrolysis, or any other chemical modification for development of color or fastness. The dyes are yellow-brown to red-brown in shade and exhibit good to excellent fastness to light, crocking, washing, sublimation and drycleaning. They are particularly useful for producing mixed shades which are difficult to formulate with a combination of primary (yellow, red and blue) colors.

In dyeing cellulosic materials with the dyes of this invention using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers to impregnate the fabric with a mixture of one or more dyes, water, and dye solvent in a conventional dye padbath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques, such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dyebaths. Such additives frequently include migration inhibitors, such as purified vegetable gums, and wetting agents, examples of which are ionic and nonionic surfactants, such as ethylene oxide condensation products, hydrocarbon sulfonates and long-chain alcohol sulfates. Dyebaths used in practicing this invention also can contain dyes other than those of this invention; for example, direct dyes or fiber reactive dyes can be present for shading purposes.

In the preferred dyeing procedure with the dyes of this invention, an aqueous dye dispersion and the organic solvent are applied to the fabric from a single padbath. The amount of water in the padbath usually is 70–95 weight % and the solvent, 5–30 weight %. The padded fabric is heated at 180°–225°C. for 30–180 seconds. For cotton, temperatures as low as 150°C. usually are adequate. The dyed fabric generally is given an aqueous scour, or an aqueous scour followed by a perchloroethylene scour, to ensure complete removal of surface dye.

The following experiments show the utility of the dyes of this invention.

Dyeing 65/35 "Dacron" Polyester/Cotton Blend Fabrics

A. A padbath was prepared from:

| | |
|---|---|
| an aqueous dye paste (15% active ingredient) containing the dye of Example 1 | 50 grams |
| purified vegetable gum thickener ("Superclear" 100N) | 20 grams |
| methoxypolyethylene glycol (molecular weight 350) | 100 grams |
| water | to 1 liter. |

A continuous length of 65/35 Dacron polyester/cotton fabric was padded at 60% uptake, based on the weight of the fiber, and the padded fabric was passed at a rate of 2 yards per minute between two 1,000 watt infrared lamps (Fostoria-Fannon, Inc. Infrared Heater Model 6,624), with each lamp shining on opposite surfaces of the fabric from a distance of about 3 inches. The continuously moving fabric was passed through a circulating air oven at 80°–100°C., with a hold-up time of one minute, and then through an oven at 200°–210°C. with a hold-up time of 1.7 minutes. The hot dry fabric was cooled to room temperature and rinsed for one minute each in sequence: in water at 20°–30°C., in water at 90°–95°C., at 90°–95°C. in water containing 1% of an ether-alcohol sulfate detergent, in water at 90°–95°C., and in water at 20°–30°C. The material was then dried and scoured for five minutes in perchloroethylene at 50°C. A uniformly deep yellow-brown shade of excellent fastness to light, crocking, sublimation, washing and drycleaning was obtained.

B. Experiment A was repeated except that the dye of Example 2 was employed. The polyester/cotton blend fabric was uniformly dyed a deep red-brown shade of excellent fastness properties.

Printing of 65/35 Dacron Polyester/Cotton Blend Fabric

C. A 65/35 Dacron polyester/cotton blend fabric was padded to about 70% pickup with an aqueous solution containing 120 grams per liter of polyethylene glycol (M.W. 600). The padded fabric was heated at 160°C. for five minutes to evaporate water. The fabric was then printed in a pattern with a print paste prepared from:

| | |
|---|---|
| an aqueous paste (15% active ingredient) containing the dye of Example 3 | 10 grams |
| purified natural gum ether thickener | 60 grams |
| water | 30 grams. |

The printed fabric was heated at 200°C. for 100 seconds, scoured in water containing an ether-alcohol sulfate detergent at about 90°C. for 5 minutes and dried. The printed areas were strongly dyed in a yellow-brown shade.

Dyeing of Dacron Polyester

The dyes of this invention can be applied to polyester from an aqueous dyebath under pressure or by a pad-heat procedure to yield similar shades. The following experiment shows the amenability of these dyes to the Thermosol process.

D. Dacron polyester fabric was immersed for fifteen minutes at 82°C. in an aqueous bath containing 1% ether-alcohol sulfate surface active agent and 1% tetrasodium pyrophosphate. The fabric was rinsed in cold water, dried, then padded at 50–60% pickup, based on the dry fabric weight, in a dyebath containing:

| | |
|---|---|
| an aqueous dye paste (15% active ingredient) containing the dye of Example 1 | 50 grams |
| purified natural gum thickener | 20 grams |
| water | to 1 liter. |

The padded material was passed through an infrared predryer, then heated to and held at 213°C. for 90 seconds. The fabric was rinsed in water at 27°C., scoured for 5 minutes at 93°C. in water containing 1% ether-alcohol sulfate detergent, rinsed in water at 27°C. and dried. The polyester fabric was dyed a deep dull orange shade.

The following examples are given to illustrate the invention. All parts are given by weight.

EXAMPLE 1

5N-Sodium nitrite (144 parts) was added to a mixture of 76 parts of 3-chloro-2-toluidine, 900 parts of acetic acid, 300 parts of water and 128 parts of concentrated hydrochoric acid which had been cooled to 0°C. After the reaction mixture had been stirred at 0°–10°C. for 30 minutes, excess nitrite was destroyed with sulfamic acid and a solution of 53 parts of 2,5-xylidine in 100 parts of acetic acid was added. The mixture was stirred for two hours, after which the solids were isolated by filtration, washed with water and dried. The yellow, monoazo intermediate (98.5 parts) was chromatographically pure. A mixture containing 10 parts of the intermediate, 150 parts of acetic acid, 50 parts of water and 22.4 parts of concentrated hydrochloric acid was cooled to 0°C. and treated with 9.76 parts of 5N-sodium nitrite solution. The reaction mixture was stirred for 30 minutes, after which excess nitrite was destroyed with sulfamic acid and the diazo solution was clarified by filtration. The filtrate was cooled externally to 0°–5°C. and treated with a solution of 7.7 parts of 3'-aminobenzanilide in 50 parts of acetic acid. The mixture was stirred for 30 minutes and the pH was then adjusted to 2.7 with 30% caustic soda. Stirring was continued for another 3 hours, after which the solids were isolated by filtration, washed with water and dried. Thin Layer Chromatography (TLC) indicated that the brown disazo intermediate thus formed contained only trace amounts of two yellow impurities. A solution of 15 parts of the disazo intermediate in 100 parts of pyridine was treated with 18 parts of benzoyl chloride and the reaction mixture was stirred at 80°–90°C. for 3 hours. TLC showed that complete conversion of the brown intermediate to the orange product had occurred. The mass was drowned in 2,000 parts of water and the solids were isolated by filtration, washed with water and dried. The dye was purified by slurrying in hot ethanol, after which the solids were isolated by filtration and dried. The chromatographically pure dye melted at 204°–207°C., showed a maximum absorptivity ($a_{max}$) in dimethylformamide (DMF) of 53.0 liters/-gram/cm. (l.g.$^{-1}$cm.$^{-1}$) at a wavelength ($\lambda_{max}$) of 420 m$\mu$., and had the structure

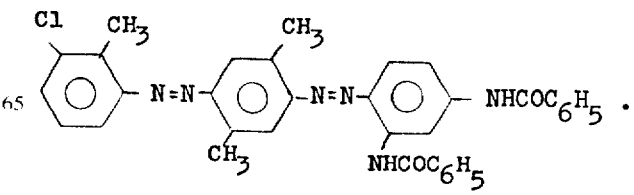

EXAMPLE 2

5N-Sodium nitrite (24.4 parts) was added to a stirred mixture of 14.1 parts of 3-chloro-2-toluidine, 200 parts of acetic acid, 50 parts of water and 28 parts of concentrated hydrochloric acid which had been cooled to 0°C. After 30 minutes excess nitrite was destroyed with sulfamic acid. A solution of 4.3 parts of α-naphthylamine in 25 parts of DMF was then added and the reaction mixture was stirred for 2 hours. The solids were isolated by filtration and washed with 50% aqueous acetic acid and then with water. The crude intermediate (29 parts) was slurried in 5N-hydrochloric acid to remove a red impurity, then isolated by filtration and washed thoroughly with water. The wet cake was added to a mixture of 300 parts of acetic acid, 60 parts of propionic acid and 11.2 parts of concentrated hydrochloric acid. The mixture was cooled externally to 0°C. and diazotization was effected by adding 24.4 parts of 5N-sodium nitrite. The mixture was stirred for 90 minutes, after which excess nitrite was destroyed with sulfamic acid. The charge was clarified by filtration and a solution of 20 parts of 3'-aminobenzanilide in 100 parts of acetic acid was added thereto. After stirring for 1 hour, the pH was raised by adding 20 parts of 30% sodium hydroxide solution and stirring was continued for 1 hour. The solids were isolated by filtration, washed with 50% acetic acid, then with water and dried, yielding 28 parts of the disazo intermediate. A mixture of 15 parts of the intermediate, 100 parts of pyridine and 18 parts of benzoyl chloride was heated at 70°–80°C. for two hours. The mass was cooled and drowned in 2,000 parts of water. The produce was isolated by filtration, washed with water and dried, affording 16 parts of crude dye. It was slurried in hot ethanol, isolated by filtration and dried. The chromatographically pure dye melted at 246°–249°C. and had an $a_{max}$ in DMF of 42.7 l.g.$^{-1}$cm.$^{-1}$ at a $\lambda_{max}$ of 490 mμ; it had the structure

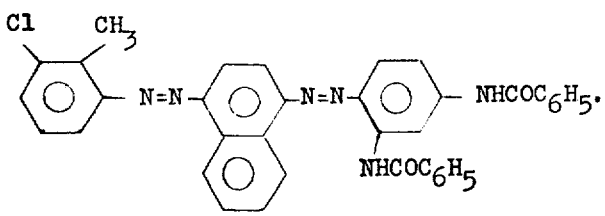

EXAMPLE 3

A mixture of 69 parts of p-nitroaniline, 800 parts of acetic acid, 200 parts of propionic acid and 148 parts of 98% sulfuric acid was cooled to 0°C. and diazotization was effected by the rapid addition of 34.5 parts of solid sodium nitrite. After stirring for 30 minutes excess nitrite was destroyed with sulfamic acid and the diazo preparation was clarified by filtration. The filtrate was cooled to 0°C. and 53.6 parts of m-toluidine were added. The charge was stirred overnight. Another 50 parts of acetic acid were added, the slurry was cooled to 0°C. and then 35 parts of solid sodium nitrite were added. After the reaction mixture had been stirred for 1 hour, excess nitrite was destroyed with sulfamic acid and a solution of 71.5 parts of α-naphthylamine in 200 parts of acetic acid was added. The reaction mixture was stirred overnight and the solids (disazo intermediate) were isolated by filtration, washed with 75% acetic acid and slurried in 1,000 parts of 10% hydrochloric acid. The solids were again isolated by filtration, washed with water until acid free and dried. A mixture of 20 parts of the disazo intermediate and 150 parts of pyridine was slowly treated with 30 parts of acetyl chloride. After stirring for 30 minutes, the reaction mixture was drowned in ice water and the solids were isolated by filtration, washed with water and dried. The crude dye was reslurried successively in ethanol and in 90% aqueous DMF and then recrystallizied from DMF. The chromatographically pure dye melted at 273°–275°C. and had an $a_{max}$ in DMF of 60 l.g.$^{-1}$cm.$^{-1}$ at a $\lambda_{max}$ of 435 mμ. The visible spectrum exhibited a second peak at 370 mμ ($a_{max}$ 50 l.g.$^{-1}$cm.$^{-1}$). The dye product had the structure

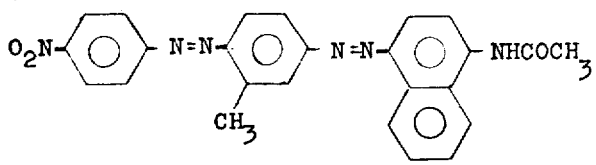

EXAMPLES 4-34

Additional dyes of this invention were prepared by procedures substantially as set forth in Examples 1-3. The results are summarized in Table 5 wherein the symbols refer to symbols previously defined. In each example $X_3$ is H except for Example 34 wherein it is 6—Cl.

TABLE 5

| Ex. No. | $X_1$ | $X_2$ | $Y_1$ | $Y_2$ | $Z_1$ | $Z_2$ | R | M.P. (°C.) | $a_{max}$ (l.g.$^{-1}$cm.$^{-1}$) | $\lambda$max. (mμ) | Shade On 65/35 "Dacron" (Polyester/Cotton) |
|---|---|---|---|---|---|---|---|---|---|---|---|
| 4 | 4-NO$_2$ | 2-Cl | 2-OCH$_3$ | 5-OCH$_3$ | 1,4-naphthylene | | phenyl | — | 45.8 | 530 | red-brown |
| 5 | 4-NO$_2$ | 2-Cl | 2-OCH$_3$ | 5-OCH$_3$ | NHCOR | H | phenyl | 268–271 | 29.0<br>36.4<br>26.0 | 350<br>535<br>390 | red-brown |
| 6 | 4-NO$_2$ | H | 2-OCH$_3$ | 5-OCH$_3$ | Cl | OCH$_3$ | phenyl | 93–95 | 19.3<br>25.0 | 430<br>340 | yellow-brown |
| 7 | 2-CH$_3$ | H | 2-CH$_3$ | H | 1,4-naphthylene | | p-nitrophenyl | 234–238 | 57.0<br>37.0 | 420<br>360 | yellow-brown |
| 8 | 4-NO$_2$ | H | 1,4-naphthylene | | NHCOR | H | phenyl | 259–261 | 42.7 | 490 | red-brown |
| 9 | 2-CH$_3$ | 3-Cl | 3-CH$_3$ | H | 1,4-naphthylene | | phenyl | — | 55.5<br>37.0 | 430<br>360 | yellow-brown |
| 10 | 2-CH$_3$ | H | 2-CH$_3$ | H | 1,4-naphthylene | | phenyl | — | 51.0 | 415 | yellow-brown |
| 11 | 4-NO$_2$ | 2-Cl | 2-CH$_3$ | 5-CH$_3$ | 1,4-naphthylene | | phenyl | — | 54.0<br>33.0 | 450<br>360 | orange-brown |
| 12 | 4-NO$_2$ | 2-CH$_3$ | 2-OCH$_3$ | 5-OCH$_3$ | 1,4-naphthylene | | phenyl | — | 47.5<br>31.0 | 520<br>350 | red-brown |
| 13 | 4-NO$_2$ | H | 3-CH$_3$ | H | 1,4-naphthylene | | phenyl | 258–261 | 55.5<br>43.0 | 435<br>350 | red-brown |

TABLE 5—Continued

| Ex. No. | $X_1$ | $X_2$ | $Y_1$ | $Y_2$ | $Z_1$ | $Z_2$ | R | M.P. (°C.) | $a_{max}$ (l.g. $^{-1}$cm. $^{-1}$) | $\lambda$max. (m$\mu$) | Shade On 65/35 "Dacron" (Polyester/Cotton) |
|---|---|---|---|---|---|---|---|---|---|---|---|
| 14 | 2-CH₃ | H | 2-CH₃ | H | 1,4-naphthylene | | p-chlorophenyl | — | 53.0 / 34.0 | 425 / 360 | yellow-brown |
| 15 | 2-CH₃ | H | 2-CH₃ | H | 1,4-naphthylene | | o-chlorophenyl | 60–62 | 25.5 / 34.5 | 410 / 350 | yellow-brown |
| 16 | 2-CH₃ | H | 2-CH₃ | H | 1,4-naphthylene | | p-anisyl | — | 43.2 / 28.9 | 425 / 360 | yellow-brown |
| 17 | 2-CH₃ | H | 2-CH₃ | H | 1,4-naphthylene | | cyclohexyl | — | 59.0 / 40.0 | 430 / 355 | yellow-brown |
| 18 | 2-CH₃ | H | 2-CH₃ | H | 1,4-naphthylene | | amyl | — | 60.6 / 40.5 | 430 / 350 | yellow-brown |
| 19 | 4-NO₂ | H | 1,4-naphthylene | | 1,4-naphthylene | | amyl | — | 52.0 | 500 | red-brown |
| 20 | 4-NO₂ | H | 3-CH₃ | H | 1,4-naphthylene | | amyl | 195–198 | 57.0 / 41.0 | 435 / 350 | yellow-brown |
| 21 | 4-NO₂ | H | 3-CH₃ | H | 1,4-naphthylene | | t-butyl | 250–252 | 59.0 / 44.0 | 440 / 355 | yellow-brown |
| 22 | 4-NO₂ | H | 3-CH₃ | H | 1,4-naphthylene | | propyl | — | 57.5 / 45.0 | 430 / 360 | yellow-brown |
| 23 | 4-NO₂ | H | 3-CH₃ | H | 1,4-naphthylene | | ethyl | — | 60.7 / 42.0 | 450 / 350 | yellow-brown |
| 24 | 4-NO₂ | H | 3-CH₃ | H | 1,4-naphthylene | | butyl | — | 52.0 / 37.0 | 445 / 350 | yellow-brown |
| 25 | 2-CH₃ | 3-Cl | 1,4-naphthyl- | | NHCOR | H | propyl | — | 52.0 | 500 | red-brown |
| 26 | 6-NO₂ | H | 3-CH₃ | H | 1,4-naphthylene | | benzyl | — | 51.0 | 445 | yellow-brown |
| 27 | 2-CH₃ | 3-Cl | 2-CH₃ | 5-CH₃ | NHCOR | H | p-anisyl | 291–292 | 47.6 | 430 | yellow-brown |
| 28 | 2-CH₃ | 3-Cl | 2-CH₃ | 5-CH₃ | NHCOR | H | methoxymethyl | 238–240 | 50.0 | 425 | yellow-brown |
| 29 | 4-CN | H | 3-OC₂H₅ | H | CH₃ | OCH₃ | CH₃ | 254–255 | 68.0 | 437 | orange |
| 30 | 4-NO₂ | 2-OCH₃ | 2-CH₃ | 5-Cl | NHCOR | OCH₃ | CH₃ | 318(dec.) | 46.3 | 506 | red-brown |
| 31 | 2-CO₂-methyl | H | 2-OCH₃ | 5-CH₃ | CH₃ | H | C₆H₅ | 186–188 | 53.5 | 420 | yellow-brown |
| 32 | 2-Br | 4-Br | 3-OC₂H₅ | H | CH₃ | CH₃ | CH₃ | 242–244 | 52.0 | 420 | yellow-brown |
| 33 | 2-CF₃ | 4-Cl | 2-CH₃ | 5-CH₃ | CH₃ | CH₃ | C₆H₅ | 272–274 | 70.5 | 410 | yellow-brown |
| 34 | 2-Cl | 4-Cl | 2-OCH₃ | 5-OCH₃ | Cl | CH₃ | CH₃ | 250–254 | 38.4 / 24.3 | 376 / 470 | brown |

The embodiments of the invention in which an exclusive property or privilege is claimed are defined as follows:

1. Dye of the formula

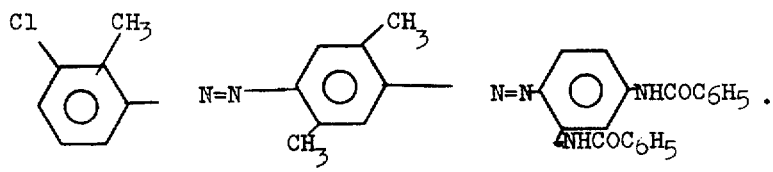

2. Dye of the formula

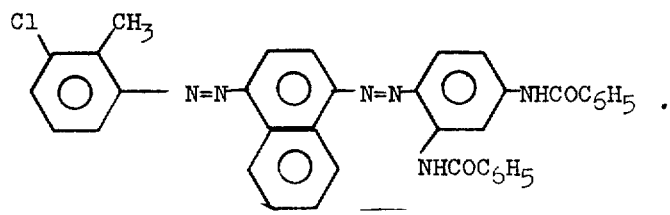

* * * * *